(12) United States Patent
Mere et al.

(10) Patent No.: US 7,233,779 B2
(45) Date of Patent: Jun. 19, 2007

(54) RADIO HUMAN-MACHINE INTERFACE USING KNOBS AND MENU PICKS

(75) Inventors: Shadi Mere, Ypsilanti, MI (US);
Steven C. Tengler, Grosse Pointe Park, MI (US); Douglas A. Pfau, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 437 days.

(21) Appl. No.: 10/619,235

(22) Filed: Jul. 14, 2003

(65) Prior Publication Data

US 2005/0014478 A1   Jan. 20, 2005

(51) Int. Cl.
*H04B 1/18* (2006.01)
*H04B 1/06* (2006.01)

(52) U.S. Cl. ............... 455/150.1; 455/154.1; 455/170.1; 455/344; 345/184

(58) Field of Classification Search ............. 455/154.1, 455/154.2, 16.1, 157.2, 158.1, 158.2, 158.4, 455/170.1, 176.1, 177.1, 180.1, 566, 344–351, 455/3.06, 150.1, 151.1, 152.1; 345/156, 345/184
See application file for complete search history.

(56) References Cited

U.S. PATENT DOCUMENTS

| | | | |
|---|---|---|---|
| 5,159,714 A * | 10/1992 | Cosentino et al. ........... 455/347 |
| 5,821,935 A * | 10/1998 | Hartman et al. ............ 715/839 |
| 5,916,288 A | 6/1999 | Hartman |
| 5,930,690 A | 7/1999 | Nakata |
| 6,104,334 A | 8/2000 | Allport |
| 6,112,063 A | 8/2000 | Ravi et al. |
| D430,562 S | 9/2000 | Richards |
| 6,154,201 A | 11/2000 | Levin et al. |
| D445,783 S | 7/2001 | Bouchard |
| D452,859 S | 1/2002 | Le Thellec |
| 6,424,337 B1 | 7/2002 | Eriksson et al. |
| 6,470,178 B1 | 10/2002 | Cummings-Hill et al. |
| 6,529,804 B1 | 3/2003 | Draggon et al. |
| 6,686,911 B1 * | 2/2004 | Levin et al. ................ 345/184 |

(Continued)

FOREIGN PATENT DOCUMENTS

DE    197 52 054 A1    11/1997

(Continued)

*Primary Examiner*—Simon Nguyen
(74) *Attorney, Agent, or Firm*—Brinks Hofer Gilson & Lione

(57) ABSTRACT

The present invention provides a human-machine interface where control is achieved without the use of buttons. By providing multiple knobs, the audio system maximizes functionality while minimizing cost and space requirements. Each knob is capable of two selection modes: a first selection mode provided by rotating the knob and a second selection mode provided by depressing the knob. The two selection modes correspond to ergonomic selection pairs for controlling the audio system. The reduced area required for controls allows for a larger display area; which provides the user with a more attractive display that can convey more information. When a change in a status, through knob manipulation is sensed by the audio system, the display automatically provides a menu that corresponds to the ergonomic pair assigned to that knob. The automated switching of menus minimizes navigation between screens, while providing full manipulation of that audio system function using a single knob control. The present invention also provides for the display to visually indicate which knob is being used.

36 Claims, 4 Drawing Sheets

U.S. PATENT DOCUMENTS

| | | | |
|---|---|---|---|
| 6,779,196 B1 * | 8/2004 | Igbinadolor | 725/75 |
| 6,920,479 B2 * | 7/2005 | McDowall et al. | 709/203 |
| 2002/0065096 A1 * | 5/2002 | Yamamoto | 455/550 |
| 2002/0135619 A1 | 9/2002 | Allport | |
| 2005/0001838 A1 * | 1/2005 | Gregorio et al. | 345/440 |

FOREIGN PATENT DOCUMENTS

| | | |
|---|---|---|
| DE | 10205641 A1 | 8/2003 |
| EP | 1 059 188 A2 | 12/2000 |
| EP | 1 246 364 A1 | 10/2002 |
| EP | 0951159 A3 | 9/2003 |
| EP | 1442920 A2 | 8/2004 |
| GB | 2330646 | 4/1999 |
| JP | 2001350579 | 12/2001 |

* cited by examiner

RADIO HUMAN-MACHINE INTERFACE USING KNOBS AND MENU PICKS

BACKGROUND

1. Field of the Invention

The present invention generally relates to human-machine interfaces. More specifically, the present invention relates to a human-machine interface for controlling a radio which eliminates the need for buttons

2. Description of Related Art

Affordance is the ability of an interface to maintain a one-to-one relationship between controls and functions of the interface. Maximizing the affordance of an interface provides intuitive navigation and improves ease of use of the system. Currently, many interfaces have embraced the concept of affordance by associating buttons with different functions of the radio or graphically associating buttons with menu choices.

Today the affordance of many radio systems is limited by the cost of creating individual buttons and controls for each function. Additionally, as the number of controls increase, the cost and space required for the additional controls translates into higher cost and creates implementation problems for the design engineers. Often budget and space constraints drive a reduction in interface optimization, even for high end customers.

In view of the above, it is apparent that there exists a need for a human-machine interface having better ratio of functionality to user controls.

SUMMARY

In satisfying the above need, as well as overcoming the enumerated drawbacks and other limitations of the related art, the present invention provides a human-machine interface that eliminates the need for buttons, but maintains a high level of intuitiveness.

In the examples discussed herein, the human-machine interface is illustrated and described in connection with the audio system of an automobile. Clearly the invention has utility beyond automotive audio systems and this invention should not be and is not intended to be construed as limited thereto.

Today's automotive radios employ a substantial number of buttons to accommodate the wide range of functionality built into the radio. As the number of single function buttons increase on the radio's human-machine interface (HMI), the size of the buttons typically decrease and the complexity of the HMI increases. Knobs, on the other hand, can intuitively provide two selection modes, pushing and twisting or rotating of the knobs. According to the present invention, by using multiple knobs, an audio system may provide maximum functionality at minimum cost and space requirements. In a radio embodying the present invention each knob is capable of two selection modes. The first selection mode is provided by rotating the knob and the second is provided by depressing the knob. The two selection modes of a given knob can be provided to correspond to ergonomic selection pairs for controlling the radio, thereby increasing the intuitiveness of the HMI while decreasing the number of discrete input controls. The reduced area required for the controls allows for a larger display area. This larger display can provide the user with a more attractive display containing additional information. When a change system status, via a knob, is sensed by the audio system, the display automatically provides a menu that corresponds to the ergonomic pair assigned to that knob. The automated switching of menus minimizes the need for navigation between display screens while providing full manipulation of that audio system function using a single control knob. The display also provides alternative options and highlights a current selection, where the selection is controlled by the knob.

In another aspect, the present invention also provides for the display to visually indicate which knob is active, last used or currently being used.

The HMI using knobs according to the present invention provides the very high control functionality in a small dedicated area, while providing an intuitive interface for the user.

Further objects, features and advantages of this invention will become readily apparent to persons skilled in the art after a review of the following description, with reference to the drawings and claims that are appended to and form a part of this specification.

DETAILED DESCRIPTION

Figure 1:
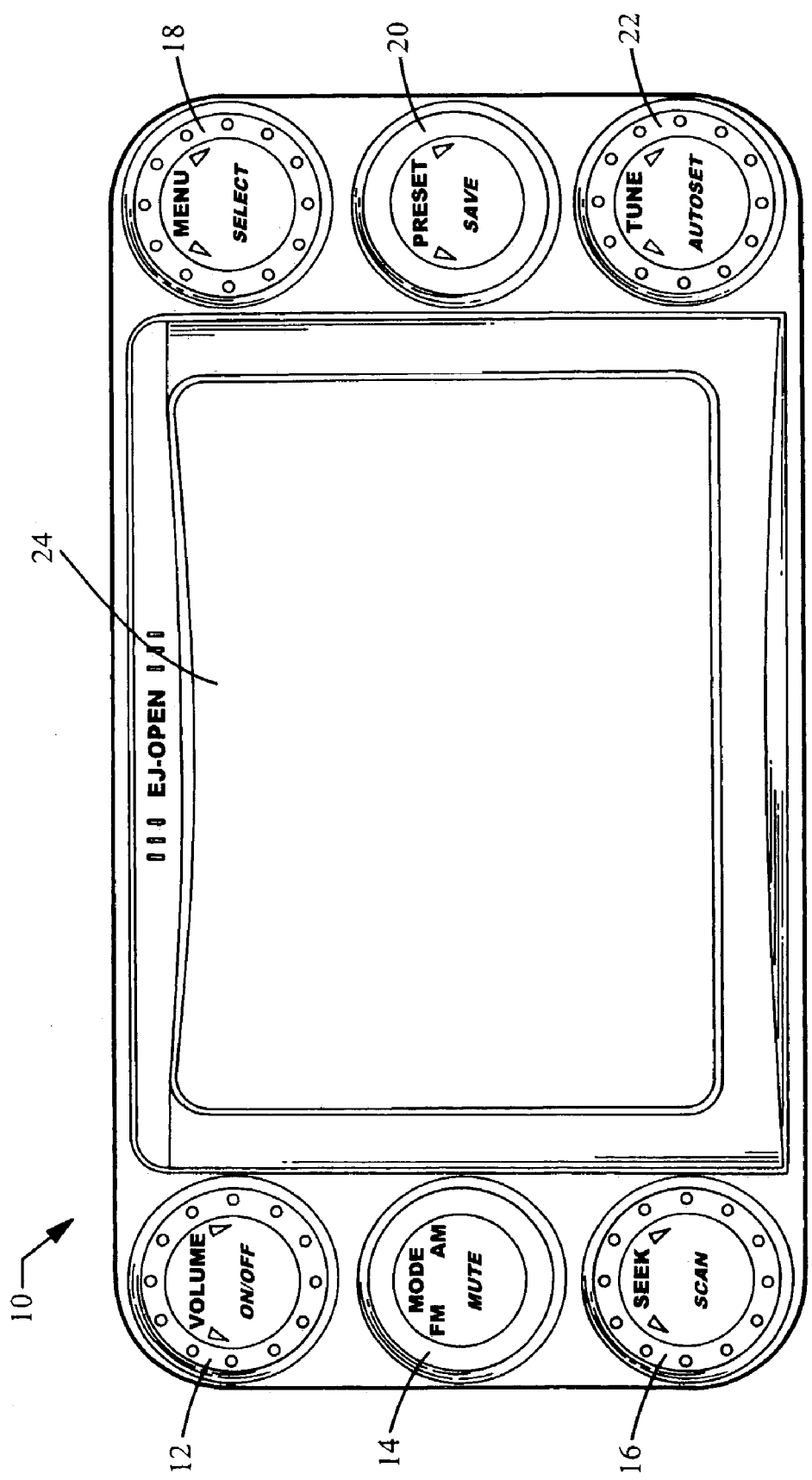
FIG. 1 is a diagrammatic view of a human-machine interface according to the present invention.

Referring now to FIG. 1, a human-machine interface embodying the principles of the present invention is illustrated therein and designated at 10. As its primary components, the human-machine interface 10 includes a display 24 and a plurality of knobs six, in the illustrated embodiment designated as knobs 12, 14, 16, 18, 20, and 22.

The display 24 is preferably an LCD display that provides the user information and options for configuring the use of the audio system. The information provided to the user on the display is organized into a number of menu screens. The functionality for each menu screen is assigned to a particular knob on the human-machine interface 10.

Each knob 12, 14, 16, 18, 20 and 22 has two selection modes The first selection mode involves rotating or twisting the knob. The second selection mode involves depressing the knob. The functionality for each menu screen is ergonomically associated with the selection modes of a particular knob. The knob-to-functionality association can be provided on two levels. First, the selection modes of each knob perform functions associated in nature. Second, a single menu screen on the display graphically ties the knob functions together and each menu screen can be fully manipulated using the one associated knob.

Knob 12 provides the ON/OFF and VOLUME control functionality of the HMI 10. As the knob 12 is rotated counter-clockwise, the volume is decreased. As the knob 12 is rotated clockwise, the volume is increased. Depressing the knob 12 toggles the radio on and off.

The AM/FM mode and MUTE functionality are controlled by knob 14. Rotating the knob 14 counter-clockwise switches the audio system into FM mode. Rotating the knob 14 clockwise switches the audio system into AM mode. Depressing knob 14 toggles the audio system between a mute mode and a normal volume mode.

Figure 2:
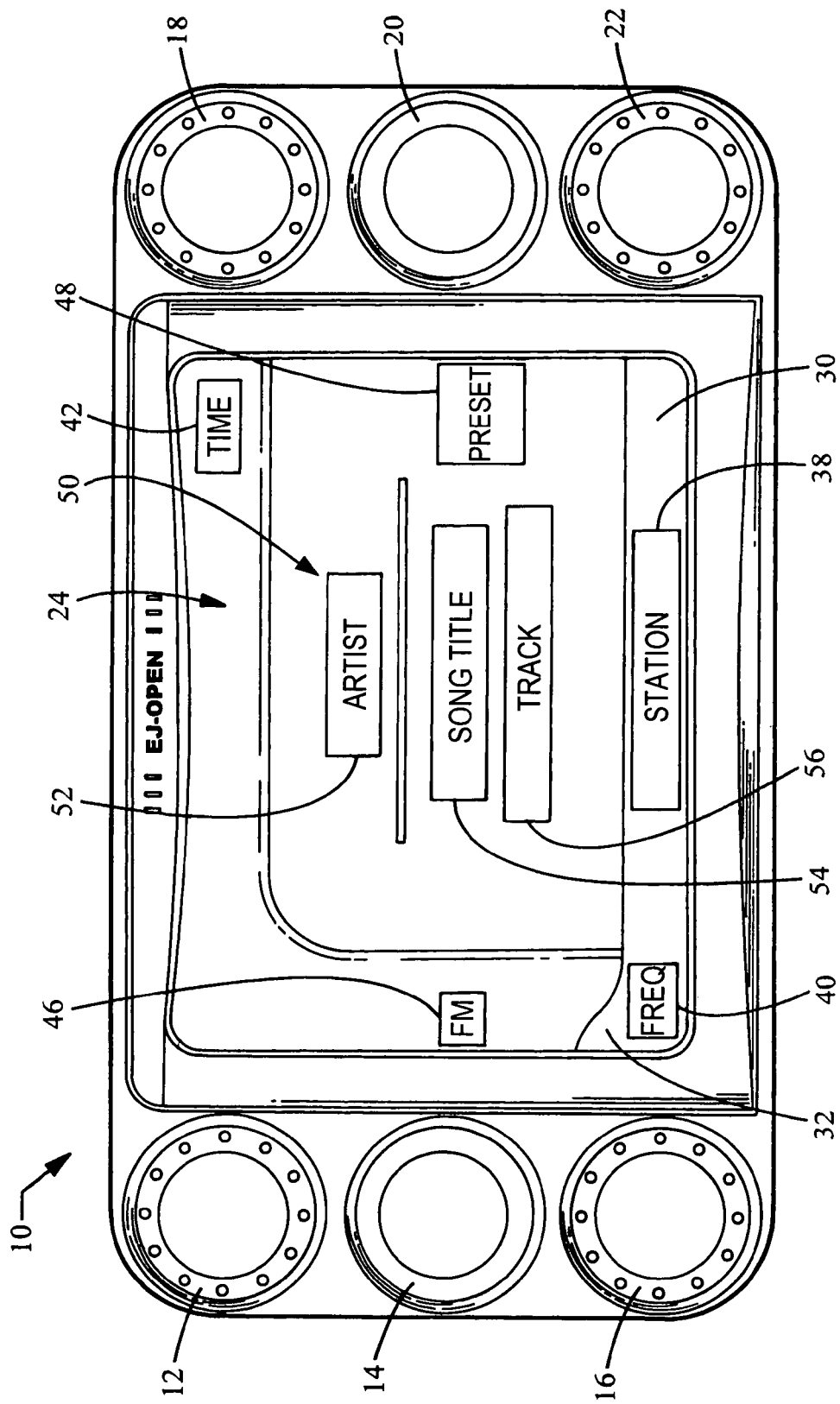
FIG. 2 is a diagrammatic view of a human-machine interface for the SEEK/SCAN ergonomic pair, according to the present invention.

Now referring to FIG. 2, SEEK and SCAN functionality of the audio system is controlled by knob 16. The SEEK functionality causes the radio to search for the next radio station with an acceptable signal strength. Rotating knob 16 counter-clockwise causes the audio system to search for the next highest frequency radio station. Rotating knob 16 clockwise causes the audio system to search for the next lowest frequency radio station with an acceptable signal strength. The SCAN functionality causes the audio system to search for radio stations with an acceptable signal level, pausing at each station for predetermined time period, such as five seconds, then continuing searching for the next highest station until the user indicates to the radio to remain at a particular station. In the present embodiment, knob 16 is depressed causing the audio system to enter scan mode, searching for stations of an appropriate signal level. Knob 16 is depressed a second time when the user wishes the radio to remain at a particular station.

FIG. 2 also illustrates a SEEK/SCAN menu as may be provided by the display 24 when knob 16 is either actuated, rotated or depressed. The SEEK/SCAN menu provides the user with a list of song information 50. The song information 50 includes the artist name (in box 52), the song title (in box 54) and track information (in box 56). In the SEEK/SCAN menu, a highlight bar 30 is located across the bottom of the display 24. The center of the highlight bar 30 may display the station call letters (in box 38) and the left side of the highlight bar 30 may display the current station frequency (in box 40). The highlight bar 30 is provided with a flair 32 at one end, which indicates that the SEEK/SCAN menu is tied to knob 16 and is located adjacent to that knob 16. The SEEK/SCAN menu may also include additional user information, such as AM/FM mode (in box 46), current time (in box 42), and current station preset (in box 48).

Figure 3:
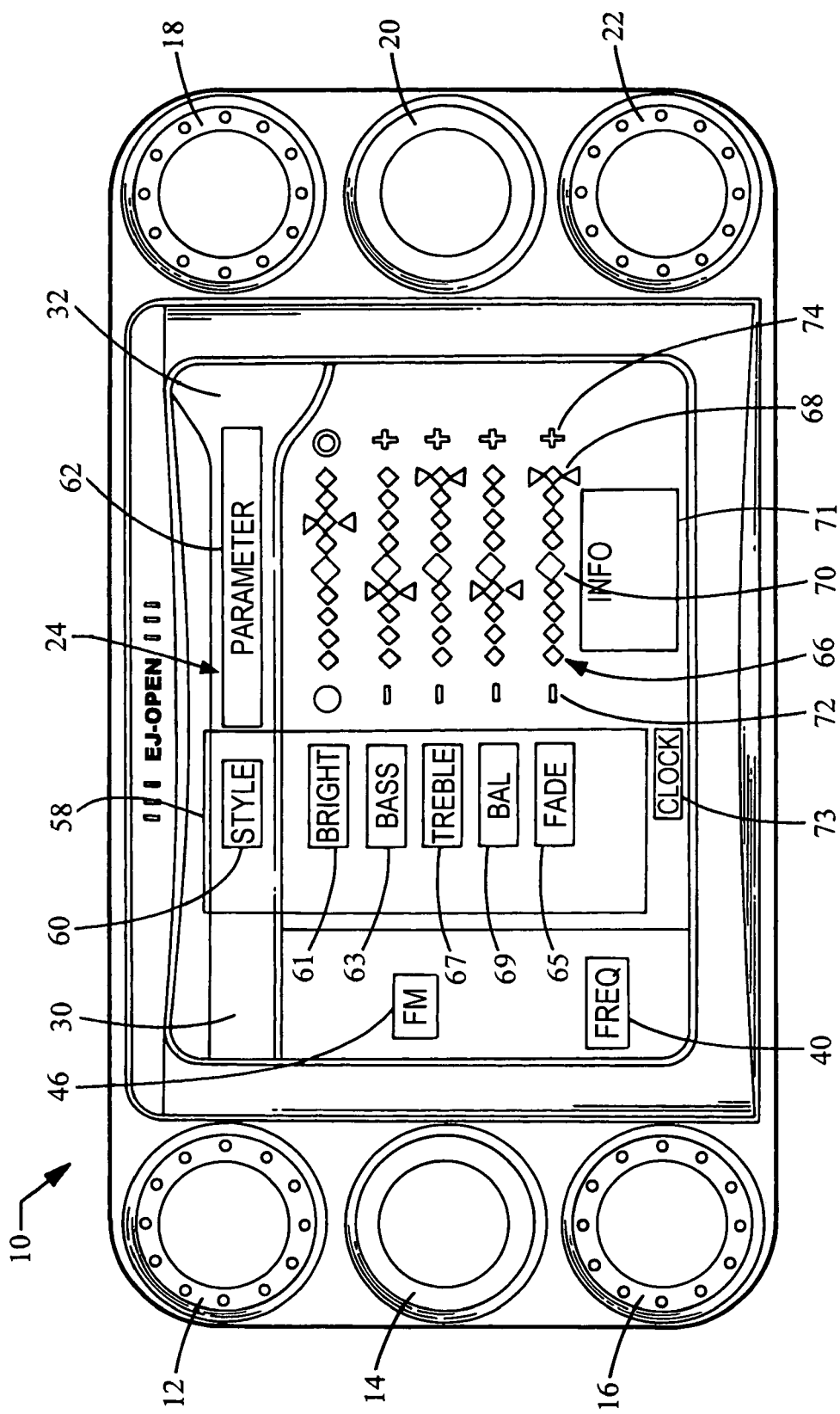
FIG. 3 is a diagrammatic view of a human-machine interface for the MENU/SELECT ergonomic pair, according to the present invention.

Now referring to FIG. 3, knob 18 controls audio system configuration utilizing a MENU/SELECT function pair. Rotating knob 18 switches between various menu options. Knob 18 can also be depressed to edit the value of the current menu option, and the knob can then be rotated to adjust the value of the current menu option.

An audio properties configuration menu is provided on the display 24 when knob 18 is rotated or depressed. This menu includes an option list (in box 58) and a highlight bar 30.

The option list 58 may include a STYLE option (in box 60), a BRIGHTNESS option (in box 61), a BASS option (in box 63), a TREBLE option (in box 67), a BALANCE option (in box 69), a FADE option (in box 65), an INFO option (in box 71), and a CLOCK HOUR option (in box 73). The option list 58 has a currently selected option shown as the STYLE option (in box 60) highlighted by the highlight bar 30. After the current option (in box 60) has been selected by depressing knob 18, the current selection parameter (in box 62) can be adjusted by rotating the knob 18. Depending on the type of option, the selection parameter can be a discrete parameter, for example, green, blue, or gray for the current STYLE parameter (in box 62). Alternatively, the option can present a range of values for the parameter, such as, the FADE option 65. The FADE option 65 provides the user with a range bar 66 indicating a range of values for the FADE parameter. The moveable indicator 68 shows the current parameter setting relative to the range of values. The center indicator 70 indicates the default setting for the parameter. The range bar 66 also includes a left icon 72 and a right icon 74 to help the user understand the effect of moving the indicator 68 to the right or left of the center indicator 70. The option list 58 may also include more options indicator 36, to notify the user that more options are available than currently displayed.

The highlight bar 30 is provided with a flair 32 adjacent to knob 18 indicating that knob 18 is used to control the audio properties configuration menu. The audio properties configuration menu may also include additional user information including the AM/FM mode 46 and the current station frequency 40.

Figure 4:
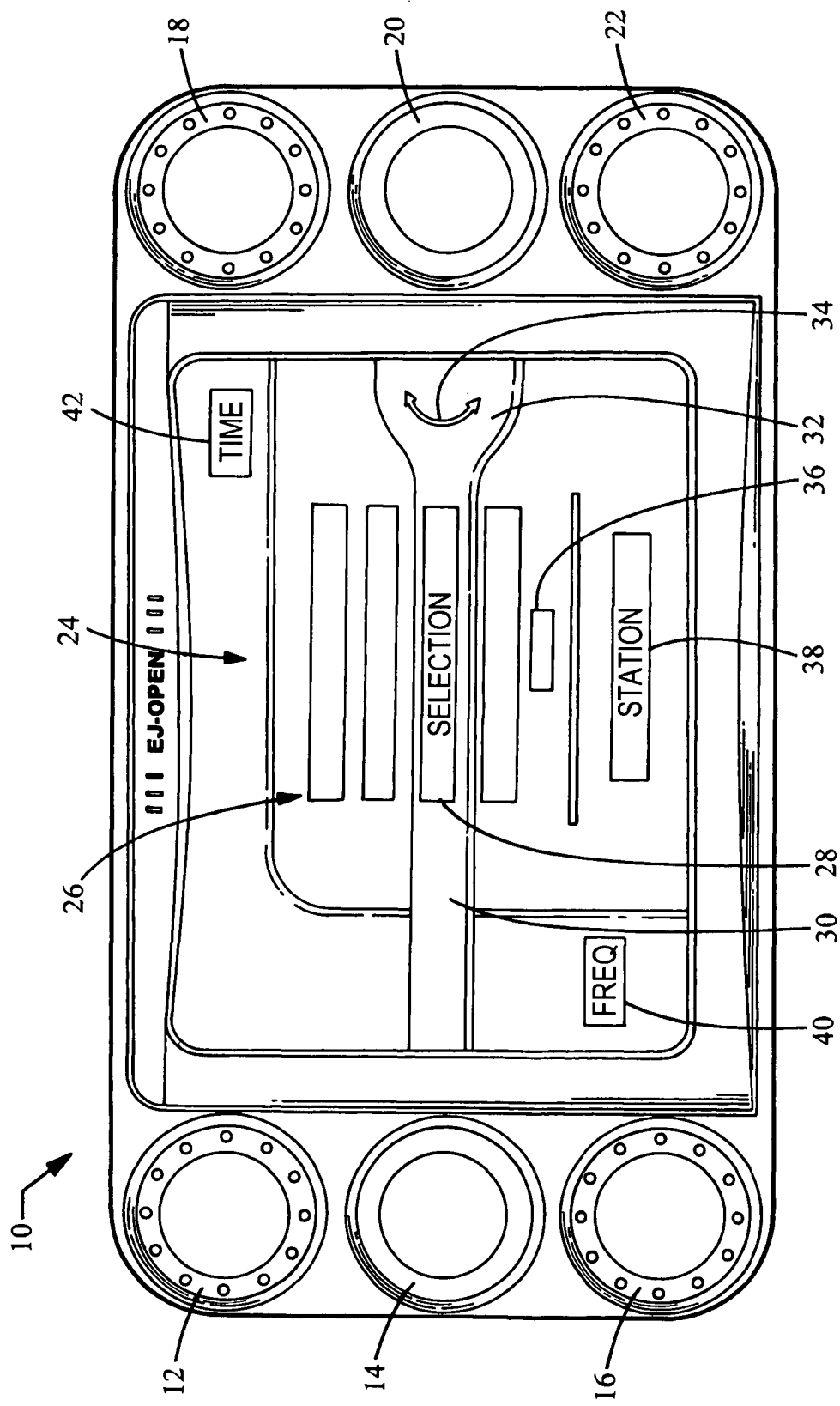
FIG. 4 is a diagrammatic view of a human-machine interface for the PRESET/SAVE ergonomic pair, according to the present invention

Now referring to FIG. 4, PRESET and SAVE functionality is provided through knob 20. In the illustrative setup, rotating knob 20 allows the user to switch between PRESET stations. Depressing knob 20 allows the user to SAVE the current station as a PRESET station. The PRESET menu is activated when knob 20 is rotated or depressed. The preset menu includes a PRESET stations list 26 and a highlight bar 30 indicating the current station.

The PRESET stations list 26 includes an additional selection indicator 36 if the selection list includes more selections than can be displayed. Rotating knob 20 indexes the PRESET selected in the highlight bar 30. The highlight bar 30 includes a flair 32 indicating that knob 20 controls the menu, as previously discussed. An icon 34 is included in the flair 32 indicating to the user to rotate the knob to index the current selection 28. Additional information may be provided to the user by the PRESET menu, including the current station frequency (in box 40), the current station call letters (in box 38), and the time (in box 42).

Knob 22 provides TUNE and AUTO SET functionality. Rotating the knob clockwise allows the user to manually increment the frequency setting of the radio. Rotating knob 22 counter-clockwise decrements the frequency setting of the radio. Depressing knob 22 activates the AUTO SET function of the radio. The AUTO SET function scans through radio stations finding radio stations of an appropriate signal strength in adding them automatically to the PRESET list.

While each of the knobs 12, 14, 16, 18, 20 and 22 has been discussed as having a particular manipulation scheme for controlling the respective menu function, persons skilled in the technology will readily appreciate that alternative manipulation schemes could be used for each of the knobs 12, 14, 16, 18, 20 and 22.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A human-machine interface for the control of an audio system, the human-machine interface comprising:
   a display in communication with the audio system;
   a plurality of knobs, at least one knob of the plurality of knobs having a first selection mode and a second selection mode, the at least one knob being rotatable in the first selection mode and being depressable in the second selection mode, the human-machine interface being controlled through the plurality of knobs, the display including a selection controlled by a knob of the plurality of knobs; and
   a visual indicator to identify a location of a knob of the plurality of knobs used to control the selection.

2. The human-machine interface according to claim 1, wherein the selection is highlighted by a bar.

3. The human-machine interface according to claim 1, the visual indicator includes the selection being located on the display to align with the knob.

4. The human-machine interface according to claim 3, wherein the visual indicator includes the shape of the bar.

5. The human-machine interface according to claim 3, comprising at least one menu screen, each knob of the at least one knob corresponding to one menu screen of the at least one menu screen.

6. The human-machine interface according to claim 5, wherein rotating a knob of the at least one knob causes the corresponding menu screen of the at least one menu screen to be displayed.

7. The human-machine interface according to claim 5, wherein depressing a knob of the at least one knob causes the corresponding menu screen of the at feast one menu screen to be displayed.

8. The human-machine interface according to claim 1, wherein each knob of the at least one knob is adapted to a first and second control function.

9. The human-machine interface according to claim 8, wherein one of the first control function includes a VOLUME control and the second control function an ON/OFF control.

10. The human-machine interface according to claim 8, wherein one of the first control function includes a AM/FM control and the second control function a MUTE control.

11. The human-machine interface according to claim 8, wherein one of the first control function includes a SEEK control and the second control function a SCAN control.

12. The human-machine interface according to claim 8, wherein one of the first control function includes a MENU control and the second control function a SELECT control.

13. The human-machine interface according to claim 8, wherein one of the first control function includes a PRESET control and the second control function a SAVE control.

14. The human-machine interface according to claim 8, wherein one of the first control function includes a TUNE control and the second control function an AUTO SET control.

15. A human-machine interface for the control of an audio system, the human-machine interface comprising:
  a plurality of knobs including a first selection mode end second selection mode, the first mode of selection including rotating the plurality of knobs, the second mode of selection including depressing the plurality of knobs, wherein the human machine interface is controlled exclusively by the plurality of knobs; and
  a display in communication with the audio system, the display adapted to provide a selection indicator and a visual indicator, the visual indicator identifying a location of a knob of the plurality of knobs used to control the selection indicator.

16. The human-machine interface according to claim 15, the visual indicator includes the selection being located on the display to align with the knob.

17. The human-machine interface according to claim 15, wherein the selection is highlighted by a bar.

18. The human-machine interface according to claim 17, wherein the visual indicator includes the shape of the bar.

19. The human-machine interface according to claim 15 comprising at least one menu screen, each knob of at least one knob corresponding to one menu screen of the at least one menu screens.

20. The human-machine interface according to claim 19, wherein rotating a knob of the at least one knob causes the corresponding menu screen of the at least one menu screen to be displayed.

21. The human-machine interface according to claim 19, wherein depressing a knob of the at least one knob causes the corresponding menu screen of the at least one menu screen to be displayed.

22. The human-machine interface according to claim 15, wherein each knob of the at least one knob is adapted to a first and second control function.

23. The human-machine interface according to claim 22, wherein one of the first control function includes a VOLUME control and the second control function an ON/OFF control.

24. The human-machine interface according to claim 22, wherein one of the first control function Includes a AM/FM control and the second control function a MUTE control.

25. The human-machine interface according to claim 22, wherein one of the first control function includes a SEEK control and the second control function a SCAN control.

26. The human-machine interface according to claim 22, wherein one of the first control function includes a MENU control and the second control function a SELECT control.

27. The human-machine interface according to claim 22, wherein one of the first control function includes a PRESET control and the second control function a SAVE control.

28. The human-machine interface according to claim 22, wherein one of the first control function includes a TUNE control and the second control function an AUTO SET control.

29. A human-machine interface for controlling an audio system, the human-machine interface comprising:
  a display in communication with the audio system; and
  at least three knobs, the at least three knobs being capable of a first and second selection mode, the first selection mode including rotating the knob, the second selection mode including depressing the knob the display including a selection and a visual indicator to identify a location of a knob of the at least three knobs used to control the selection.

30. The human-machine interface according to claim 29, the visual indicator includes the selection being located on the display to align with the knob.

31. The human-machine interface according to claim 29, wherein the selection is highlighted by a bar.

32. The human-machine interface according to claim 31, wherein the visual indicator includes the shape of the bar.

33. The human-machine interface according to claim 29, comprising at least one menu screen, each knob of at least one knob corresponding to one menu screen of the at least one menu screens.

34. The human-machine interface according to claim 33, wherein rotating a knob of the at least one knob causes the corresponding menu screen of the at least one menu screen to be displayed.

35. The human-machine interface according to claim 33, wherein depressing a knob of the at least one knob causes the corresponding menu screen of the at least one menu screen to be displayed.

36. The human-machine interface according to claim 29, wherein each knob of the at least one knob is adapted to a first and second control function.

\* \* \* \* \*

UNITED STATES PATENT AND TRADEMARK OFFICE
CERTIFICATE OF CORRECTION

PATENT NO.         : 7,233,779 B2
APPLICATION NO. : 10/619235
DATED               : June 19, 2007
INVENTOR(S)       : Shadi Mere et al.

It is certified that error appears in the above-identified patent and that said Letters Patent is hereby corrected as shown below:

In the Claims

Column 5, line 18, after "screen of the at" delete "feast" and substitute --least-- in its place.

Column 5, line 45, after "selection mode" delete "end" and substitute --and-- in its place.

Column 5, line 49, delete "human machine" and substitute --human-machine-- in its place.

Column 6, line 17, after "control function" delete "Includes" and substitute --includes-- in its place.

Signed and Sealed this

Twenty-first Day of August, 2007

JON W. DUDAS
*Director of the United States Patent and Trademark Office*